UNITED STATES PATENT OFFICE.

KENNETH H. HUNTER, OF GREAT BEND, PENNSYLVANIA.

COMPOSITION OF MATTER FOR SOFTENING LEATHER.

1,257,355.     Specification of Letters Patent.     Patented Feb. 26, 1918.

No Drawing.     Application filed June 3, 1914. Serial No. 842,763.

*To all whom it may concern:*

Be it known that I, KENNETH H. HUNTER, a citizen of the United States, residing at Great Bend, in the county of Susquehanna and State of Pennsylvania, have invented certain new and useful Improvements in Composition of Matter for Softening Leather, of which the following is a specification.

This invention relates to a new composition for softening leather and leather articles which comprises essentially a fish oil or whale oil such as first press moellon oil; wool grease; and an aqueous alkaline solution of soap. I have found it desirable in some cases to add a vegetable oil such as an oil obtained from flax and cotton seed or a light fish oil or sod oil. The first press moellon oil is the fish oil which is first pressed out of sheep skins after the latter have been tanned therein, and may contain various impurities.

My composition consists of the following ingredients combined in the proportions as stated:

First press moellon oil or either fish or whale oil, 40 pounds; light fish oil or light whale oil, 15 pounds; wool grease, 15 pounds; water substantially pure (with soap and soda co-mingled with it at the rate of 7 pounds of each to 150 gallons of water) 30 pounds, making a total of 100 pounds.

In a modified form, I may use first press or raw moellon oil 30 pounds; vacuum oil 25 pounds; wool grease 15 pounds; water substantially pure (soap and soda co-mingled at the rate of 7 pounds of each to 150 gallons of water) 30 pounds, making a total of 100 pounds.

In another modified form, first press moellon oil 58 pounds; wool grease 12 pounds; sod oil 5 pounds; water substantially pure (co-mingled with soap and soda at the rate of 7 pounds of each to 150 gallons of water), 25 pounds, making a total of 100 pounds.

In a further modified form of my composition of matter, I mix together first press moellon oil, 74 pounds; wool grease 6 pounds; water substantially pure (comingled with it soap and soda at the rate of 7 pounds of each to 150 gallons of water) 20 pounds, making a total of 100 pounds.

In the preparation of and comingling of these ingredients, I first heat the wool grease until it is of a thin consistency, like water. I then heat the water to a boiling point and then comingle with it the soap and soda at the rate of 7 pounds of each to 150 gallons of water. I then heat the oil to be mingled with the foregoing ingredients until it is warm. I then pour my wool grease thus heated into a mixer or agitator. I then pour into it the water. These two ingredients are then mingled by thorough agitation until they become a soapy substance. I then add the heated oil slowly; I then agitate the ingredients until the co-mingled ingredients become cooled. This composition of matter is applied to the leather by rubbing it upon the same causing thereon to be produced a soft, yielding surface without in any way injuring the leather body to which it is applied.

I claim:

1. As a new composition of matter for softening leather, the same comprising a liquid mixture of raw moellon oil, wool grease, and water containing soap and soda in solution therein, the several substances being heated separately and then mixed thoroughly by agitation until cooled.

2. As a new composition of matter for softening leather a mixture comprising raw or first press moellon oil 74 parts, vacuum oil 25 parts, wool grease 15 parts, and 30 parts of an aqueous solution having 7 pounds of soap and 7 pounds of soda to each 150 gallons of water.

In testimony whereof I have affixed my signature in presence of two witnesses.

KENNETH H. HUNTER.

Witnesses:
   E. A. JOYNER,
   M. F. TERRY.

*Copies of this patent may be obtained for five cents each, by addressing the "Commissioner of Patents, Washington, D. C."*